United States Patent
Hicks et al.

(10) Patent No.: US 10,901,877 B2
(45) Date of Patent: Jan. 26, 2021

(54) TEST REGRESSION CREATING BUCKET BY USING PACKAGE OF CODE TO BE TESTED

(71) Applicant: International Business Machines Corporation, Armonk, NY (US)

(72) Inventors: Andrew Hicks, Wappingers Falls, NY (US); Miles C Pedrone, Wappingers Falls, NY (US); Tynan J. Garrett, Poughkeepsie, NY (US); Michael Peter Lyons, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/426,144

(22) Filed: May 30, 2019

(65) Prior Publication Data
US 2020/0379881 A1    Dec. 3, 2020

(51) Int. Cl.
*G06F 9/44* (2018.01)
*G06F 11/36* (2006.01)

(52) U.S. Cl.
CPC ........ *G06F 11/368* (2013.01); *G06F 11/3608* (2013.01); *G06F 11/3664* (2013.01)

(58) Field of Classification Search
CPC . G06F 11/368; G06F 11/3608; G06F 11/3664
USPC .................................................. 717/124–130
See application file for complete search history.

(56) References Cited

U.S. PATENT DOCUMENTS

| | | | |
|---|---|---|---|
| 5,703,788 A | 12/1997 | Shei et al. | |
| 6,002,871 A * | 12/1999 | Duggan | G06F 11/3664 714/38.12 |
| 6,002,992 A * | 12/1999 | Pauwels | G06F 11/3696 702/123 |
| 6,172,757 B1 * | 1/2001 | Lee | G01B 11/26 356/399 |
| 6,895,578 B1 * | 5/2005 | Kolawa | G06F 11/3624 714/E11.209 |
| 6,993,487 B2 * | 1/2006 | Bluvband | G06F 8/73 704/251 |
| 7,080,357 B2 | 7/2006 | Foster et al. | |
| 7,334,219 B2 * | 2/2008 | Cebula | G06F 11/3688 714/38.14 |
| 7,765,525 B1 * | 7/2010 | Davidson | G06F 11/3624 717/124 |

(Continued)

FOREIGN PATENT DOCUMENTS

CN     102591777 A     7/2012

OTHER PUBLICATIONS

Mariani et al, "Compatibility and regression testing of COTS—component-based software", IEEE, pp. 1-10 (Year: 2007).*

(Continued)

*Primary Examiner* — Anil Khatri
(74) *Attorney, Agent, or Firm* — Cantor Colburn LLP; Teddi Maranzano

(57) ABSTRACT

Aspects include receiving a request in a system for code that uses a code package to be tested. Sources are scraped to find a matching code package that uses the code package to be tested. The matching code package is retrieved and stored in a database. The matching code package is assembled into a test bucket and the test bucket is provided for the code package to be tested.

17 Claims, 4 Drawing Sheets

(56) References Cited

U.S. PATENT DOCUMENTS

| | | | |
|---|---|---|---|
| 8,195,983 B2* | 6/2012 | Celeskey | G06F 11/3688 714/37 |
| 8,245,194 B2 | 8/2012 | Atkin et al. | |
| 8,276,123 B1 | 9/2012 | Deng et al. | |
| 8,549,480 B2* | 10/2013 | Cohen | G06F 11/368 717/125 |
| 8,745,592 B1 | 6/2014 | Ormandy et al. | |
| 8,850,272 B2* | 9/2014 | Pasala | G06F 11/008 714/38.1 |
| 8,868,981 B2 | 10/2014 | Glaser et al. | |
| 8,898,639 B2 | 11/2014 | Lawrance et al. | |
| 9,015,667 B2 | 4/2015 | Meijer et al. | |
| 9,058,424 B1 | 6/2015 | Bienkowski et al. | |
| 9,111,037 B1* | 8/2015 | Nalis | G06F 11/3664 |
| 9,170,927 B1 | 10/2015 | Kuhl et al. | |
| 9,201,773 B1* | 12/2015 | Cohen | G06F 8/30 |
| 9,317,412 B1* | 4/2016 | Cohen | G06F 11/3688 |
| 9,348,734 B2 | 5/2016 | Hoff | |
| 9,454,351 B2 | 9/2016 | Anderson et al. | |
| 9,507,695 B2* | 11/2016 | Rajamanickam | G06F 11/3676 |
| 9,632,754 B2 | 4/2017 | Gyure et al. | |
| 9,864,679 B2* | 1/2018 | Brealey | G06F 11/3692 |
| 9,983,982 B1* | 5/2018 | Kumar | G06F 11/3664 |
| 10,146,676 B1* | 12/2018 | Khanduri | G06F 11/3692 |
| 10,296,444 B1* | 5/2019 | Choudhary | G06F 11/3664 |
| 2002/0059561 A1 | 5/2002 | Foster et al. | |
| 2012/0042210 A1 | 2/2012 | Glaser et al. | |
| 2012/0089868 A1 | 4/2012 | Meijer et al. | |
| 2013/0041613 A1 | 2/2013 | Bhide et al. | |
| 2013/0167121 A1 | 6/2013 | Hoff | |
| 2014/0189641 A1 | 7/2014 | Anderson et al. | |
| 2015/0286554 A1 | 10/2015 | Kuhl et al. | |
| 2018/0060221 A1 | 3/2018 | Yim et al. | |

OTHER PUBLICATIONS

Orso et al, "Scaling Regression Testing to Large Software Systems", ACM, pp. 241-251 (Year: 2004).*

Baysal et al, "Investigating technical and non-technical factors influencing modern code review", Empir Software Eng. pp. 932-959 (Year: 2016).*

Aho et al, "Code Generation Using Tree Matching and Dynamic Programming", ACM, pp. 491-516 (Year: 1989).*

Krichner et al, "Formal Validation of Pattern Matching Code", ACM, pp. 187-197 (Year: 2005).*

Gligoric et al, "Selective Mutation Testing for Concurrent Code", ACM, pp. 224-234 (Year: 2013).*

Parsai et al, "Mutation Testing as a Safety Net for Test Code Refactoring", ACM, pp. 1-7 (Year: 2015).*

Jin et al, "Improved Side Matching for Matched-Texture Coding", IEEE, pp. 1-5 (Year: 2014).*

Mell et al; "The NIST Definition of Cloud Computing—Recommendations of the National Institute of Standards and Technology"; U.S. Department of Commerce; Sep. 2011; 7 pages.

* cited by examiner

TEST REGRESSION CREATING BUCKET BY USING PACKAGE OF CODE TO BE TESTED

BACKGROUND

The present invention generally relates to testing systems, and more specifically, to test regression bucket creation.

During the coding process, it is necessary to generate test cases that test parts of the code from one architecture or operating system to another. Code packages vary based on what part of the architecture that they use. For example, a Web API package varies greatly from an analytics package in terms of what types of instructions it will execute, its code structure, and its workload dynamics. Regression testing tests changes to computer programs to ensure that functionality previously implemented in the program works after changes in code or environment. Typically these tests are placed into regression buckets for different functional parts of the code.

SUMMARY

Embodiments of the present invention are directed to a computer-implemented method for the creation of test regression buckets. A non-limiting example computer-implemented method includes receiving a request in a system for code that uses a code package to be tested. Sources are scraped to find a matching code package that uses the code package to be tested. The matching code package is retrieved and stored in a database. The matching code package is assembled into a test bucket and the test bucket is provided for the code package to be tested.

Embodiments of the present invention are directed to a system for creating test regression buckets. A non-limiting example of the system includes a processor in communication with one or more types of memory. The processor is configured to perform a method that includes receiving a request in a system for code that uses a code package to be tested. Sources are scraped to find a matching code package that uses the code package to be tested. The matching code package is retrieved and stored in a database. The matching code package is assembled into a test bucket and the test bucket is provided for the code package to be tested.

Embodiments of the invention are directed to a computer program product for creating test regression buckets, the computer program product comprising a computer readable storage medium having program instructions embodied therewith. The program instructions are executable by a processor to cause the processor to perform a method. A non-limiting example of the method includes receiving a request in a system for code that uses a code package to be tested. Sources are scraped to find a matching code package that uses the code package to be tested. The matching code package is retrieved and stored in a database. The matching code package is assembled into a test bucket and the test bucket is provided for the code package to be tested.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
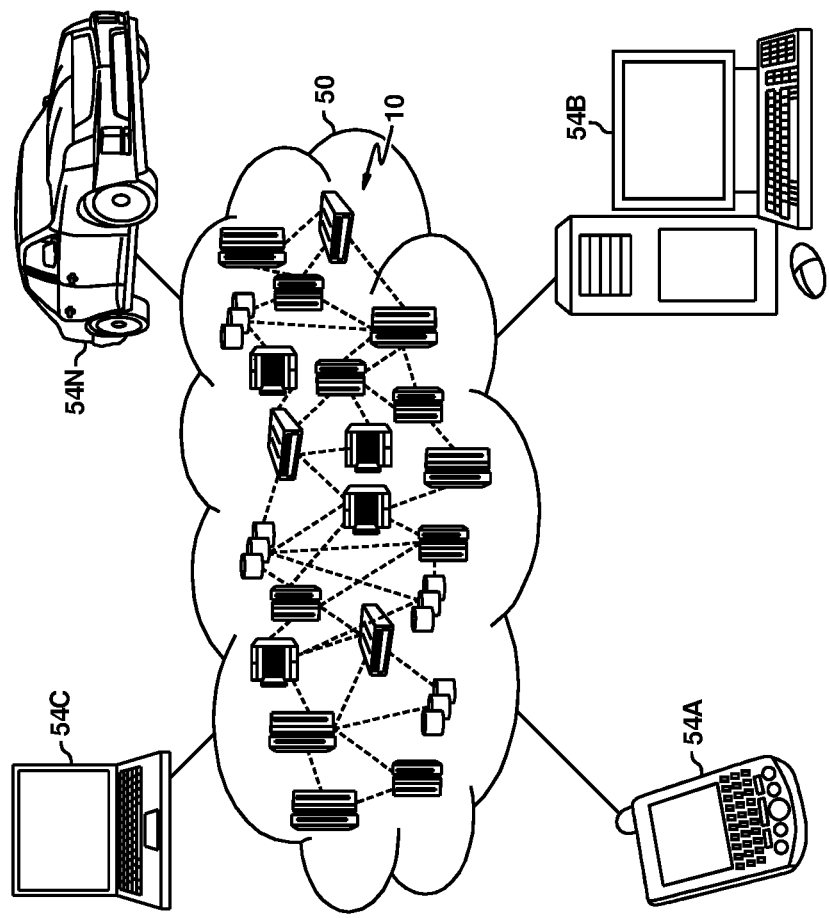
FIG. 1 depicts a cloud computing environment according to an embodiment of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
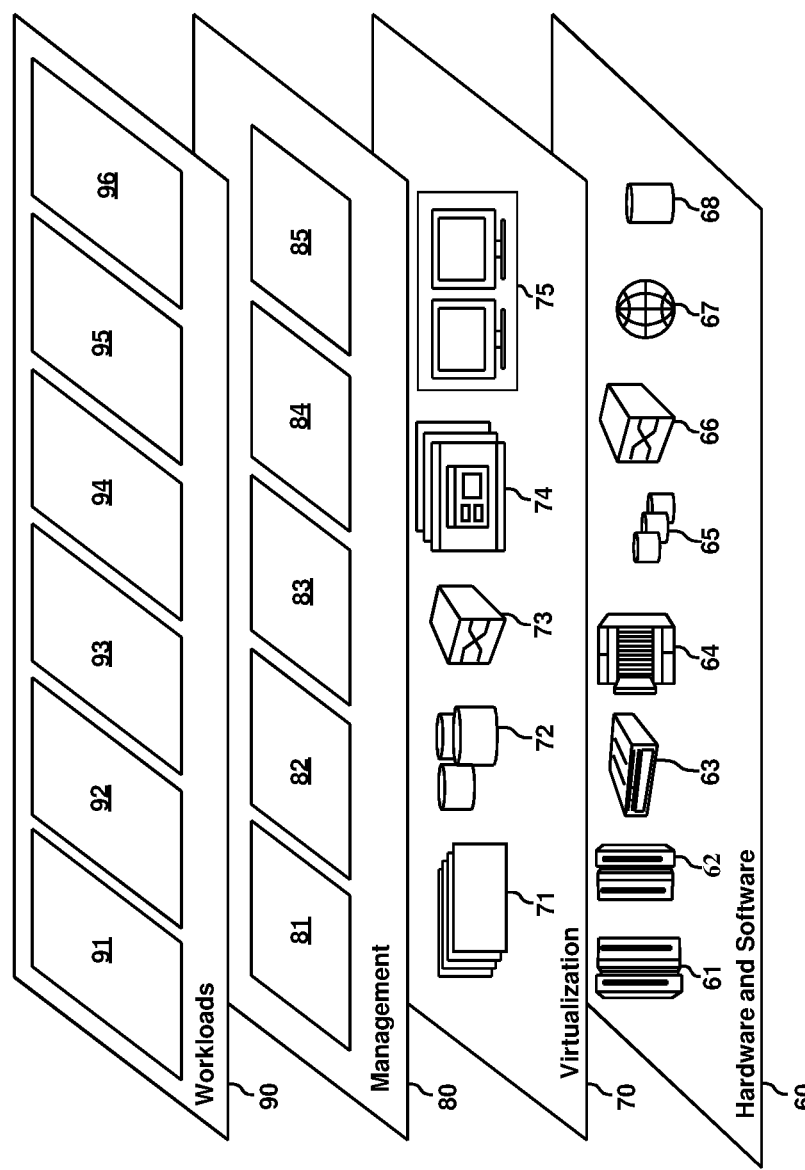
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; scraping processing 95; and test regression processing 96.

Figure 3:
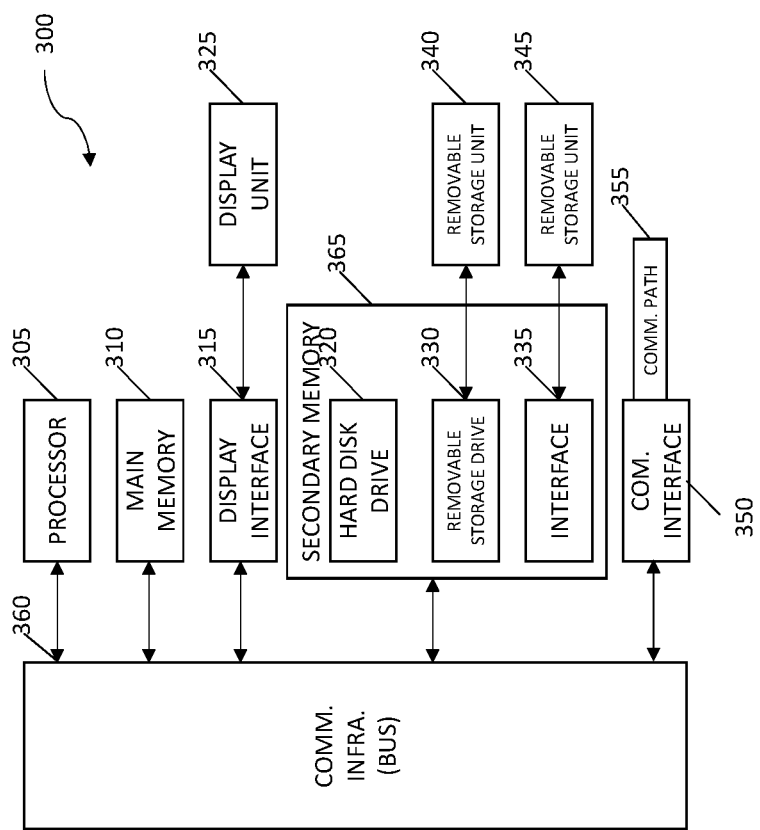
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, when trying to run large code packages across various platforms it can be hard to generate test cases that will properly test parts of the code that change from one architecture or operating system to another. Packages can also vary based on what part of the architecture that they use and knowing what those are can be very difficult. For instance, a Web API package would vary greatly from an Analytics package in terms of what types of instructions it would execute, code structure, and workload dynamics. As a result, it becomes almost untenable with respect to time and complexity to produce one's own test cases to produce a quality package port to be used by downstream developers or customers.

When testing packages for certain languages like python, there can be differences in the way the underlying architectures work, which can cause all sorts of problems. The issue is creating test cases that might bring these issues to the surface to allow for quality code packaging to other developers or customers. Typically tests like this need to be developed by hand and need a good working knowledge of both architectures as well as the package that is being used. The amount of time this takes can be very long.

Turning now to an overview of the aspects of the invention, one or more embodiments of the invention address the above-described shortcomings of the prior art by providing a system in which code from the internet is retrieved and analyzed from various sources. The code is also grouped by various characteristics. These characteristics, for example, might be the packages used, a number of packages used, references to byte encoding, references to endianness, file input/output (IO), IO in general, exceptions, code complexity, and code rating. Once the code has been identified in relation to a particular package the code snippets are stored in a database along with the output of that code run on the originating platform. When a user wants to test a new package on a new system, he or she will gather the necessary code and run it in an environment on the new architecture. Each of the resulting outputs is checked against the old platform, and the failing matches are highlighted for the developer to work through.

The above-described aspects of the invention address the shortcomings of the prior art by providing a package testing system where the code is executed as well as another system (known as the daemon system) that can be used to create and deploy the packages and tests onto the testing system for execution. The method starts with a tester/developer wanting to deploy a new package onto the new type of platform but is unsure as to what might be the places to concentrate on for testing. The tester will interact with the system and specify the central repository or location where the code is coming from for the packages that want to be used on the test system. The system will then determine if the code is new to the system, fetch the code if it is new or changes, store the code into a database, and assemble the appropriate test cases or test regression buckets.

The methodology described herein provides significant advantages over prior methods. For example, large test suites are created that cover a great deal of functionality. There is an automated system to handle exceptions. There is also a system of optimized regression buckets that are provided, where the regression buckets are optimized for speed and coverage. This method leads to higher quality porting and the ability to track package changes over time.

Figure 4:
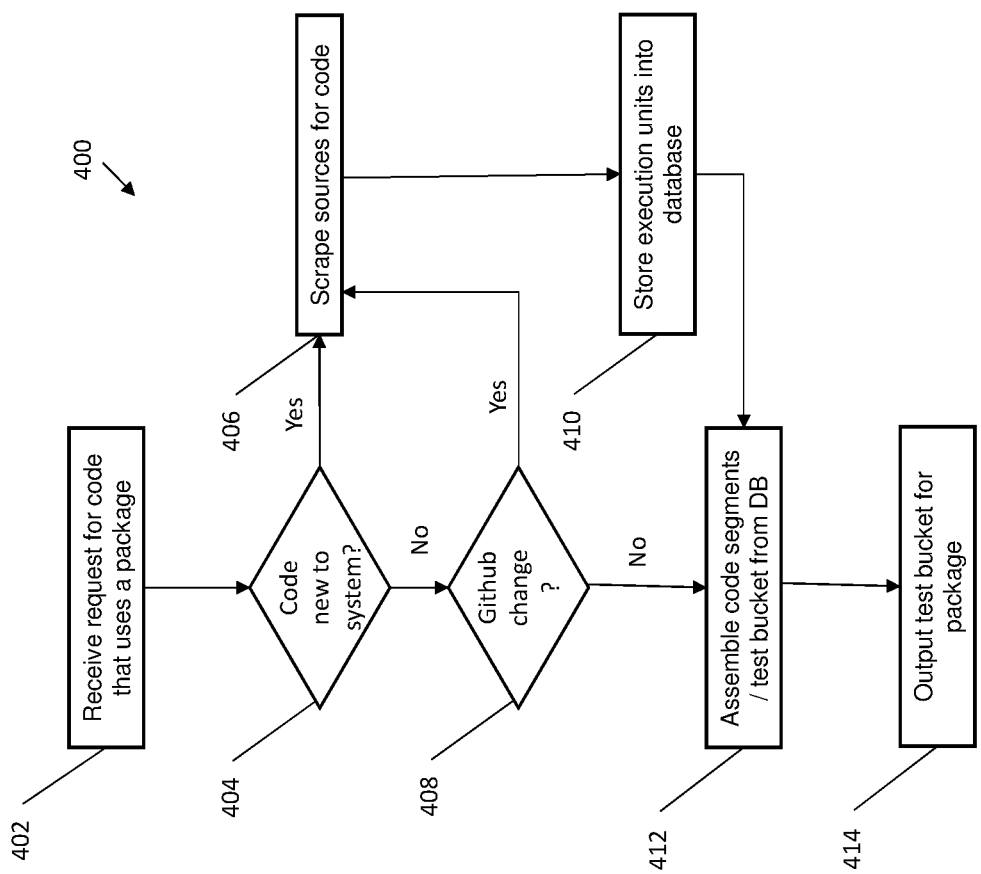
FIG. 4 depicts a flowchart of a test regression bucket creation method according to embodiments of the invention.

Turning now to a more detailed description of aspects of the present invention, FIG. 4 depicts a flowchart of a test regression bucket creation method 400 according to embodiments of the invention. The following discussion of the method is with respect to the method running on the computer depicted in FIG. 3, although it also applies to the cloud computing system of FIGS. 1 and 2. A request is received by processor 305 for code that uses a package (Stage 402). A check is made by processor 305 to determine if the code is new to the system under test (Stage 404).

If the code is new to the system (Stage 404), sources are scraped by processor 305 for the code (Stage 406). In searching for the code across the web, fuzzy searches may be used. Similarly, fuzzy searches may be used by processor 305 throughout method 400 in the course of verifying and running code. The sources may include those across the breadth of the web, along with well-known sources. In addition to scraping the code, characteristics about the code are also retrieved by processor 305 from the site having the code, including, number of packages used, exceptions tested for, code rating, and length of code. In addition, method 400 also examines by processor 305 the quality of the source from which the code is obtained. Where there are multiple sources with code available, the method 400 retrieves by processor 305 the code from the highest quality source. The quality of a source is defined by a user to tune the parameters that are optimized for testing. Also, following code retrieval, the method 400 scans by processor 305 for endianness that may be different between platforms and scans for I/O operations, looking for particular exceptions. In addition, scanning of program byte code to detect performance harming instruction sequences can also be performed.

If the code is not new to the system, a test is made by processor 305 to determine if a central repository of code, such as Maven, has changed code or if there is a new package version (Stage 408). When a new version is available, flow returns to Stage 406 where a new web scrape grabs code paths from the web to see what functionality might only be present in the new version.

Following scraping code from the web at Stage 406, the new code and associated information retrieved is stored by processor 305 in a database in memory 365 (Stage 410). New packages stored in the database in memory 365 are added to a package monitoring list that the daemon system has a process running that is configured to run either automatically (not shown) or just being used for package checks in Stage 408. Differences between packages are recorded by processor 305 in the database, and the package test case database is segmented based on package version by processor 305 between versions, tracking any dependencies internally. The daemon system may also be configured to automatically run and post errors to a message queue that is sent to developers.

Method 400 continues to the stage where code segments and test buckets are assembled by processor 305 from the database (Stage 412). Once a new package or version of package code scraping has been completed the test assembly stage is entered. The test suites are generated by processor 305 based on what the user would like to do. The user specifies that she would like to run all known test cases against the package, in which case all tests are gathered from the database. The user might also want test cases with large numbers of exceptions or a large amount of complexity run, in which case a subset of test cases are obtained and deployed with the package to the testing system. Another use case is running several packages together to make sure there is not negative interaction between the packages. Here the method 400 is particularly useful as combined tests can be found through joins on the database and deployed to the system. Following assembly, the test regression bucket of test cases is output or provided to the user (Stage 414).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor, a request in a system for code that uses a code package to be tested;
scraping, by the processor, sources to find a matching code package that uses the code package to be tested;
retrieving, by the processor, the matching code package;
storing, by the processor, the retrieved, matching code package in a database, the matching code package comprising code and an output generated by a previous execution of the code;
adding the matching code package to a monitoring list;
assembling, by the processor, the matching code package into a test bucket; and providing, by the processor, the test bucket for the code package to be tested;
executing the code to generate new output; and
highlighting any differences between the output generated by a previous execution of the code and the new output;
checking, by the processor, if the code package to be tested is new to the system; and
when the code package to be tested is not new to the system, retrieving, by the processor, the matching code package from the database instead of scraping sources.

2. The computer-implemented method of claim 1, further comprising:
checking, by the processor, if the code package to be tested is new to the system;
checking, by the processor, if the code package to be tested is different from a central repository code package; and
when the code package to be tested is not new to the system and not different from a central repository code package, retrieving, by the processor, the matching code package from the database instead of scraping sources.

3. The computer-implemented method of claim 1, wherein retrieving, by the processor, the matching code package further comprises retrieving characteristics about the matching code package.

4. The computer-implemented method of claim 3, wherein the characteristics about the matching code package are selected from the group consisting of number of packages used, exceptions tested for, code rating, and length of code.

5. The computer-implemented method of claim 1, wherein scraping, by the processor, sources to find a matching code package further comprises using fuzzy searches to search for and retrieve the matching code package.

6. The computer-implemented method of claim 1, wherein scraping, by the processor, sources to find a matching code package and retrieving, by the processor, the matching code package further comprise finding a plurality of matching code packages and only retrieving the matching code package from the highest quality source having the matching code package.

7. A computer program product for test regression bucket creation, the computer program product comprising:
a computer readable storage medium readable by a processing circuit and storing program instructions for execution by the processing circuit for performing a method comprising:
receiving a request in a system for code that uses a code package to be tested;
scraping sources to find a matching code package that uses the code package to be tested;
retrieving the matching code package;
storing the retrieved, matching code package in a database, the matching code package comprising code and an output generated by a previous execution of the code;
adding the matching code package to a monitoring list; assembling the matching code package into a test bucket; and providing the test bucket for the code package to be tested; executing the code to generate new output; and
highlighting any differences between the output generated by a previous execution of the code and the new output;
checking if the code package to be tested is new to the system; and
when the code package to be tested is not new to the system, retrieving the matching code package from the database instead of scraping sources.

8. The computer program product of claim 7, wherein the method further comprises:
checking if the code package to be tested is new to the system;
checking if the code package to be tested is different from a central repository code package; and
when the code package to be tested is not new to the system and not different from a central repository code package, retrieving the matching code package from the database instead of scraping sources.

9. The computer program product of claim 7, wherein retrieving the matching code package further comprises retrieving characteristics about the matching code package.

10. The computer program product of claim 9, wherein the characteristics about the matching code package are selected from the group consisting of number of packages used, exceptions tested for, code rating, and length of code.

11. The computer program product of claim 7, wherein scraping sources to find a matching code package further comprises using fuzzy searches to search for and retrieve the matching code package.

12. The computer program product of claim 7, wherein scraping sources to find a matching code package and retrieving the matching code package further comprise finding a plurality of matching code packages and only retrieving the matching code package from the highest quality source having the matching code package.

13. A processing system for test regression bucket creation, the processor system comprising:
a processor in communication with one or more types of memory, the processor configured to perform a method comprising:
receiving a request in a system for code that uses a code package to be tested;
scraping sources to find a matching code package that uses the code package to be tested;
retrieving the matching code package;
storing the retrieved, matching code package in a database, the matching code package comprising code and an output generated by a previous execution of the code;
adding the matching code package to a monitoring list; assembling the matching code package into a test bucket; and providing the test bucket for the code package to be tested; executing the code to generate new output; and
highlighting any differences between the output generated by a previous execution of the code and the new output;

checking if the code package to be tested is new to the system; and when the code package to be tested is not new to the system, retrieving the matching code package from the database instead of scraping sources.

14. The processing system of claim 13, wherein the method further comprises:

checking if the code package to be tested is new to the system;

checking if the code package to be tested is different from a central repository code package; and when the code package to be tested is not new to the system and not different from a central repository code package, retrieving the code package from the database instead of scraping sources.

15. The processing system of claim 13, wherein retrieving the matching code package further comprises retrieving characteristics about the matching code package.

16. The processing system of claim 13, wherein scraping sources to find a matching code package further comprises using fuzzy searches to search for and retrieve the matching code package.

17. The processing system of claim 13, wherein scraping sources to find a matching code package and retrieving the matching code package further comprise finding a plurality of matching code packages and only retrieving the matching code package from the highest quality source having the matching code package.

* * * * *